United States Patent [19]

Moroni et al.

[11] Patent Number: 4,803,230

[45] Date of Patent: Feb. 7, 1989

[54] POLYOLS-POLYESTERS AND USE THEREOF IN THE PRODUCTION OF POLYURETHANE FOAMS

[75] Inventors: Renato Moroni, Arese; Marino Brocci, Gallarate, both of Italy

[73] Assignee: Montedipe S.p.A., Milan, Italy

[21] Appl. No.: 124,680

[22] Filed: Nov. 23, 1987

[30] Foreign Application Priority Data

Nov. 28, 1986 [IT] Italy ............................. 22494 A/86

[51] Int. Cl.[4] .............................................. C08G 18/14
[52] U.S. Cl. ............................... 521/168; 252/182.14; 252/182.15; 252/182.16; 521/169; 521/171; 521/48.5; 528/287; 528/299; 560/103; 560/111
[58] Field of Search ............. 521/168, 169, 171, 48.5; 252/182.14, 182.15, 182.16; 528/287, 299; 560/103, 111

[56] References Cited

U.S. PATENT DOCUMENTS 3,647,759  3/1972  Walker ................................ 528/305
4,346,229  8/1982  Derr et al. .......................... 521/172

Primary Examiner—Maurice J. Welsh
Attorney, Agent, or Firm—Stevens, Davis, Miller & Mosher

[57] ABSTRACT

Halogen- and/or phosphorus-containing polyols-polyesters obtained by esterification and transesterification of the residues from the process for producing dimethyl terephthalate with a polyol at least 5% by weight of which is constituted by a glycol having the formula

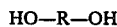

HO—R—OH wherein R is a halogen- and/or phosphorus-containing aliphatic, aromatic, cycloaliphatic or alkyl-aromatic radical. Said halogen- and/or phosphorus-containing polyesters-polyols are used for the production of fire-resistant polyurethane foams.

9 Claims, No Drawings

POLYOLS-POLYESTERS AND USE THEREOF IN THE PRODUCTION OF POLYURETHANE FOAMS

DESCRIPTION OF THE INVENTION

The present invention relates to polyols-polyesters produced from the residues from the process for producing dimethyl terephthalate (hereinafter called DMT).

More particularly, the present invention relates to liquid polyols-polyesters which are obtained by esterification and transesterification reactions of the residues from the process for producing DMT with particular polyols and which are particularly suitable to be used in the production of polyurethane foams.

It is known to prepare polyurethane foams by the reaction of a polyisocyanate, a polyol, and a blowing agent, in the presence of a catalyst.

For the preparation of said polyurethane foams, and particularly the rigid foams, a wide variety of polyols have been proposed.

As an example, U.S. Pat. No. 2,965,615 suggests the use of co-polymers of alkenyl-substituted aromatic compounds such as styrene, and ethylenically unsaturated monohydric alcohols, such as allyl alcohol, as useful in polurethane production.

U.S. Pat. No. 3,647,759 suggests producing polyurethane foams by reaction of a polyisocyanate with a polyester-polyol obtained by transesterification of the residues from the process for producing DMT with ethylene glycol.

The polyurethane foams thus obtained find useful utility in the insulation art as thermal insulating materials, structural reinforcements, etc.

One factor limiting the widespread utilization of polyurethane foams is their flammability.

Numerous attempts have been made for decreasing this drawback of the polyurethane foams. One known method consists in adding to the reaction composition fire-retardant agents; these agents may be either of the non-reactive type which are incorporated by a mere mechanical mixing or of the reactive type which become chemically linked to the polymeric chain.

The first type of fire-retardant agents comprises tris (chloroethyl) phosphate, tris(2,3-dibromopropyl) phosphate, ammonium phosphate, antimony trioxide, calcium carbonate, magnesium carbonate, etc.

Examples of fire-retardant agents which link to the polymer chain are phosphorus-containing or chlorinated polyols.

All the above-mentioned materials are effective as fire-retardants; however, they have disadvantages in adversely influencing the mechanical and physical properties of the resulting foam, as well as the processability of the obtained product.

Moreover, the employment of certain fire-retardant materials in the reaction mixture containing the polyisocyanate, produces toxic combustion products.

Another method for imparting fire-retardant properties to polyurethane foams is that of producing formulations which form isocyanurate structures. This method, however, is not devoid of disadvantages since high levels or quantities of isocyanate are required in order to impart the desired fire-resistant properties to the polyurethane foams. These high levels or quantities of isocyanate lead to the production of friable products, especially on the surface, which do not have the required compressive strength and which have weak adhesion to a support.

It has been discovered, according to the present invention that the presence in the polyurethane chain of units derived from the trans-esterification and esterification of the residues from processes for producing DMT with a glycol containing halogen and/or phosphorus radicals leads to the production of polyurethane foams having the required fire-resistant properties without any adverse influence on any of the other mechanical-physical properties of the resulting product.

The present invention therefore contemplates halogenand/or phosphorus-containing polyols-polyesters obtained by esterification and transesterification of the residues from the process for producing DMt with a polyol of which at least 5% by weight is constituted by a glycol having the formula:

HO—R—OH—       (1)

wherein R is a halogen- and/or phosphorus-containing aliphatic, aromatic, cycloaliphatic or alkyl-aromatic radical.

The present invention moreover contemplates polyurethane foams comprising the reaction product obtained by reacting, in the presence of a blowing agent, an organic polyisocyanate with a halogen- and/or phosphorus-containing polyol-polyester obtained by esterification and transesterification of residues from the process for producting DMT with a polyol of which at least 5% by weight is constituted by a glycol having the formula:

HO—R—OH       (1)

wherein R has the above-mentioned meanings.

In the preparation of the polyols-polyesters of the present invention, the amount of the halogen- and/or phosphoruscontaining glycol of general formula (1) is note critical, although amounts such as to give a halogen- and/or phosphorus-content between 2 and 20% by weight, referred to the polyesterpolyol, are preferred.

According to a preferred embodiment of the present invention, the glycols of the formula (1) may be selected among those in which R is a halogenated aliphatic radical containing from 2 to 20 carbon atoms, a halogenated alkyl-aromatic radical containing from 7 to 30 carbon atoms, a halogen-containing polyether, a halogen-containing polyester, an alkyl phosphate radical, an alky phosphonate radical, or an alkyl phosphite radical or a mixture thereof. As halogen, chlorine or bromine is preferably used.

The term "polyol", whenever used in the present specification and claims, means an aliphatic or cycloaliphatic glycol having from 2 to 12 carbon atoms such as ethylene glycol; diethylene glycol; propylene glycol; 1,4-butane-diol; neopentylene-glycol, 1,6-hexane-diol; 2-methyl-hexane-1,6-diol; dodecane-1,12-diol; decane-1,10-diol; cyclohexane-diol; 1,4-xylilene-glycol; oxy-diethylene-glycol; oxy-dipropylene-glycol, etc.; and a polyoxyethylene glycol or a polyoxypropylene glycol having a molecular weight between 150 and 500.

The term "residue" mentioned above refers to the purged residues which are obtained during the manufacture of DMT starting from p.xylene.

As is well known, DMT is produced by a continuous process which consists in oxidizing the p-xylene to p-toluic acid; in esterifying the p-toluic acid with methanol to form methyl p-toluate; in air-oxidizing the methyl p-toluate to monomethyl ester of terephthalic acid; and in esterifying the monomethyl ester with methanol to form DMT. The esterification product is then distilled to give a distillate comprising DMT and methyl-p-toluate, and an esterified-oxidized residue. The DMT is recovered and methyl-p-toluate is returned to the oxidation step.

The esterified-oxidized residue (hereinafter called DMT process residue) is a tar-like solid material, composed of a highly complex mixture comprising high molecular weight monomeric constituents, polymeric constituents, methyl- and benzyl-esters of biphenyl- and triphenyl-dicarboxylic and -tricarboxylic acids, and, optionally, catalysts.

A typical example of DMT process residue has the following properties:
Color: Dark brown
Softening Point: 60°-100° C.
Acid Number (accord-to ASTM D 1639 Standard): 10-40
Methoxy groups (—COOCH$_3$): 7–30% by weight
DMT: 0–20% by weight
Saponification Number (according to Anal Chem., 23, 1126 (1951): 375–500

U.S. Pat. No. 3,647,759, the disclosure of which for brevity is incorporated herein by reference as an integral part of the present description, describes in detail the residues of the kind indicated above and its properties, as well as the transesterification procedure using ethylene glycol.

The polyol-polyesters of the present invention are obtained by reacting DMT process residues, as above set forth, with an excess of a polyol containing one or several glycols of formula (1) above. The reaction is preferably carried out at atmospheric or lower pressure.

The amount of polyol containing one or more glycols of formula (1) is not critical, provided that the quantity is sufficient to provide greater than 1 mole per equivalent of available acid and methyl-ester groups present in the residue. Preferably, from 1.25 to 10 moles, and still more preferably from 1.4 to 4 moles, are recommended per equivalent of available acid and methyl-ester. Larger amounts may also be used, but since additional advantages are not usually realized thereby, amounts greater than 10 moles, per equivalent of acid and methyl-ester, are not recommended for reasons of economy.

The reaction between the residue and the polyol results in transesterification and esterification of the methyl-ester and acid components respectively of the residue, to provide a polyester having terminal hydroxyl groups at one end.

The DMT process residue may in some cases contain one or more of the catalysts which were used to promote the oxidation and esterification reaction in the DMT process.

In case the catalysts are present in a quantity sufficient for carrying out the esterification and transesterification reactions, no addition of catalysts is required. Otherwise, a catalytic quantity of a conventional transesterification catalyst, such as zinc acetate, calcium acetate, magnesium acetate, tin salts or esters, titanium esters, and the like, is preferably added to the mixture.

The temperature range in which the esterification and transesterification reactions of the DMT process residue is effected may vary between 100° and 250° C., although lower or higher temperature than this range of values may be used.

The period of time sufficient for complete reaction is between 2 and 20 hours, and preferably between 3 and 10 hours. The higher the reaction temperature the shorter the time required for substantially complete reaction.

Generally, the reaction is performed in the absence of other liquids or reaction medium. While the reaction is taking place, methanol and water are formed which are removed from the reaction medium. The polyols, herein comprised of the glycols of formula (1), optionally removed with the methanol, are preferably returned to the reaction medium.

Upon completion of the reaction, the polyester-polyol reaction product is recovered and, if desired, unreacted excess of polyol is removed from the reaction mixture, as for example, by vacuum distillation.

Usually it is preferred to retain a slight excess of polyol in the polyester-polyol to modify the viscosity and provide additional functional hydroxyl groups. Generally the polyol quantity in excess is not higher than 25% by weight.

The reaction product, under standard conditions, is a liquid polyester-polyol containing phosphorus and/or halogen groups and having the following properties:
State: liquid
Viscosity at 25° C.: 5,000–40,000 mPa's
Color: Dark brown
Acid number: 1–10
Hydroxyl number (mg/g): 200–600
Methoxy groups 13 COOCH$_3$: 0–5% by weight.

Examples of halogen- or phosphorus-containing glycols having formula (1), which may be used for the esterification and transesterification of the DMT process residues, are:

(a) halogen-containing alkyl glycols such as dichloro-ethylene glycol; dibromo-ethylene glycol; 2,3-dichloro-butane-1,4-diol; 2,3-dibromo-butane-1,4-diol; 2,3-dibromo-propane-1,3-diol; ,3-dichloropropane-1,3-diol; dibromo- or dichloro-neopentyl glycol and the like;

(b) diester derivatives of halogen-containing alkyl glycols such as dibromo-neopentyl-glycol adipate of formula:

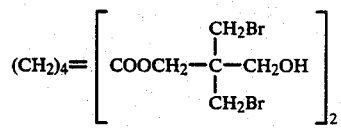

(c) halogen-containing aryl glycols, such as tetra-bromo-bisphenol-A of formula:

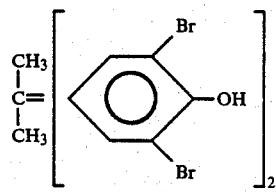

(d) oxyalkylene derivatives of halogen-containing aryl glycols, such as bis (2-hydroxyethyl-ether) of tetra-bromobisphenol A of formula:

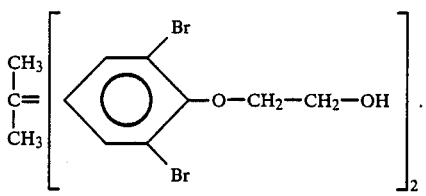

(e) halogen- and phosphorus-containing oxyalkylene derivatives, such as bis (dipropylene-glycolhydroxy-2,2,2-trichloro-ethylphosphonate of formula:

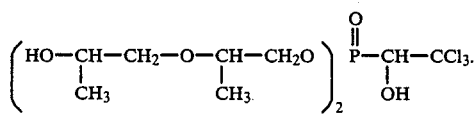

(f) oxyalkylene derivatives of the pyrophosphoric or phosphoric acid, such as the compound having the formula:

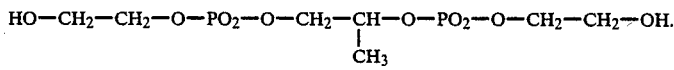

(g) oxyalkylene derivatives of phosphonic acid, such as diethyl-N,N-bis-2-hydroxy-ethyl-amine-ethylphosphonate of formula:

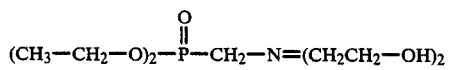

(sold under the trade name fyrol 6)

(h) oxyalkylene derivatives of aryl dicarboxylic acids, such as diester based on tetrabromophthalic anhydride, propylene oxide and diethylene glycol, of formula:

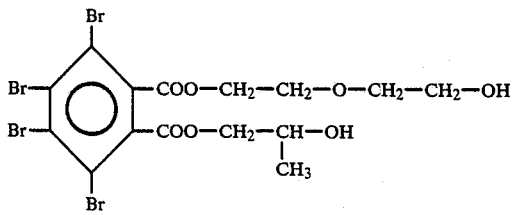

diester based on chlorendic acid (MET) and diethylene glycol, of formula:

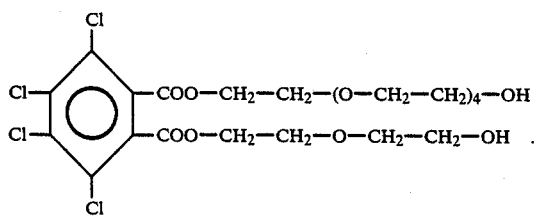

The halogen- and/or phosphorus-containing polyesters-polyols of the present invention may be used alone or in admixture with conventional polyols to prepare polyurethane foams in one step by reacting all the ingredients together at once according to the one-shot process; or by the pre-polymer method.

The conventional polyols may be as above reported, or they may comprise a polyol-polyester obtained by the reaction of the DMT process residues with a glycol, as described in U.S. Pat. Nos. 3,647,759 and 4,346,229, the contents of which are an integral part of the present description.

One particular type of polyurethane foam composition wherein halogen- and/or phosphorus-containing polyol-polyester of the present invention is used, is the following:

| COMPONENTS | PARTS % BY WEIGHT |
|---|---|
| Component A | |
| Polyisocyanate | A quantity such that the ratio NCO/OH groups is between 0.7 and 3, and preferably between 0.9 and 1.1 |
| Component B | |
| Halogen- and/or phosphorus-containing polyester-polyol alone or in admixture with other polyols | 94.5–46 |
| Catalyst | 0.5–2 |
| Blowing agent | 4–50 |
| Surfactant agent | 1–2 |
| | 100 |

In the production of the polyurethane foam of the present invention, any organic polyisocyanate, particularly diisocyanate, or reactive —NCO group-containing compounds may be employed. Preppolymers having reactive isocyanate or —NCO groups may also be employed. For illustrative and exemplification purpose, the following may be mentioned: methylene-diphenyl-di-isocyanate and its 2,4'- and 4,4'-isomers and mixtures thereof, and their higher aligomers namely poly-phenyl-methane-polyisocyanate, generally called polymeric MDI; m- and p-phenylene di-isocyanates; chlorophenylene diisocyanates; alpha, alpha'-xylylene diisocyanate; 2,4- and 2,6-toluene di-isocyanate and mixtures thereof; toluidine diisocyanate; hexamethylene di-isocyanate; 1,5-napthalene diisocyanate; methylene-bis-(cyclohexyl isocyanate) and their 4,4'- and 2,4'-isomers and mixtures thereof. The preferred polyisocyanate is polyphenyl-methane-polyisocyanate.

Catalysts may be generally used to increase the reaction rate between the polyisocyanate and the glycols.

All the catalysts known in the art, which catalyze the reaction between the isocyanate group and the reactive hydrogencontaining compounds, may be used. A detailed list of catalysts is disclosed, for example, in U.S. Pat. Nos. 2,620,516; 2,621,166 and 2,729,618, herein cited for convenient reference.

Suitable blowing agents include water, the fluorochlorocarbons and hydrocarbons which boil at a temperature in the range of from about −30° to about 50° C., such as, for example, trichlorofluoromethane, trichlorofluoroethane, dichloromonofluoromethane, monochloroethane, monochloromonofluoroethane, difluoromonochloroethane, difluorodichloroethane, pentane, and mixtures thereof.

Suitable surfactants may be the silicones, such as, for example, DC 193 manufactured and sold by Dow-Corning.

The polyurethanes, containing in the polymeric chain units deriving from the transesterification and esterification of the DMT process residues with a halogen- and/or phosphorus-containing glycol, have a high flame resistance, at least B2, good physical and mechanical properties such as dimensional stability of the foams, no friability or adverse behavior on ageing, and good insulating properties.

The following examples are given to still better understand the present invention and to contemplate the best mode of carrying out it without, however, being a limitation thereof.

EXAMPLE 1

2,000 g of DMT process residue having the following properties:
- Molecular weight = 325
- Melting point = 75°–80° C.
- Acid Number = 28
- Saponification No. = 466
- Methoxyl groups = 18.7%
- DMT = 10% were introduced into a reactor fitted with a stirrer and a fractional distillation column, and heated until fluid enough to stir readily.

While stirring,
- 380 g of dibromo-neopentyl glycol;
- 4 g of dibuthyl titanate, and
- 2,000 g of diethylene glycol, were added.

The resulting mixture was maintained in a nitrogen stream, under vacuum up to 6 mm Hg, for 12 hours at 130°–200° C., while a distillate consisting of methanol and excess diethylene glycol was removed.

At the end of the 12 hour period, the reaction product had an acid number of 1 and a methoxyl group content of 0.32%.

The heating was terminated and the resulting mixture was cooled.

The resinous product had a viscosity of 9,000 m Pas, a hydroxyl number of 400 mg for 1 g of substance, a diethylene glycol content of 15%, and a bromine content of 5% by weight.

EXAMPLE 2

This example illustrates the use of the product obtained in Example 1 in the production of rigid polyurethane foams.

100 parts by weight of the resinous product of Example 1 were mixed, at room temperature, with:
- 1.4 parts by weight of a siliconic surfactant agent (DC 193 sold by Dow Corning);
- 4 parts by weight of glycerine, as cross-linking agent;
- 1.5 parts by weight of dimethyl-cyclohexylamine, as catalyst;
- 1.2 parts by weight of water; and 30 parts by weight of trichlorofluoromethane.
- 100 parts by weight of polyphenyl-methane-polyisocyanate (produced and sold by Montedipe S.p.A. Under the trade name TEDIMON 31) were added to the uniform mixture. The NCO/OH ratio was 1.06.

The resulting mixture was stirred vigorously for 15 seconds and left to foam for 60 seconds. A rigid polyurethane foam was obtained having the properties reported in the following table.

EXAMPLE 3

The procedure of Example 1 was repeated except that the dibromo-neopentyl glycol was replaced by an equivalent quantity of diethylene glycol.

The obtained polyol-polyester had a viscosity of 9,000 m Pas and a hydroxyl number of 390 mg for 1 g of substance.

100 parts by weight of the above obtained polyol-polyester were mixed with:
- 1.4 parts by weight of a siliconic surfactant agent (DC 193 sold by Dow Corning);
- 4 parts by weight of glycerine, as cross-linking agent;
- 1.5 parts by weight of dimethyl-cyclohexylamine, as catalyst;
- 1.2 parts by weight of water, and 30 parts by weight of trichlorofluoromethane.
- 100 parts by weight of polyphenyl-methane-polyisocyanate were added to the above mixture and a rigid polyurethane foam was prepared from the resulting mixture by following the operating procedures of Example 2.

The properties of the obtained polyurethane foams are listed in the following table:

TABLE

| Properties | Method | Unit | Ex. 2 | Ex. 3 |
|---|---|---|---|---|
| Density | ASTM D1622 | g/l | 26 | 26 |
| Closed cells | ASTM D2856 | % | 86 | 88 |
| Compressive strength | | | | |
| Parallel to rise | ASTM D1621 | Kg/cm$^2$ | 1 | 0.9 |
| Perpendicular to rise | ASTM D1621 | Kg/cm$^2$ | 0.7 | 0.6 |
| HEAT CONDUCTIVITY | ASTM C177 | W/m °C. | 0.015 | 0.016 |
| FIRE BEHAVIOR | DIN 4102 | | B2 | B3 |

What is claimed is:

1. Polyols-polyesters obtained by esterification and transesterification of DMT process residues with a polyol wherein at least 5% by weight of the polyol is constituted by a glycol have the formula:

$$HO-R-OH \qquad (I)$$

wherein R is a halogen- and/or phosphorus-containing aliphatic, aromatic, cycloaliphatic or alkyl-aromatic radical.

2. Polyols-polyesters according to claim 1, wherein the glycol of the above formula (I) is selected from the class consisting of those wherein the bivalent radical R is a halogenated aliphatic radical having from 2 to 20 carbon atoms, a halogenated alkyl-aromatic radical having from 7 to 30 carbon atoms, a halogen-containing polyether radical, a halogen-containing polyester radical, an alkyl-phosphate radical, an alkyl-phosphonate radical, an alkyl-phosphite radical, and mixtures thereof.

3. Polyols-polyesters according to claim 1 or 2, wherein the glycols of formula (1) are selected from the class consisting of halogen-containing alkyl glycols, diester derivatives of the halogen-containing alkyl glycols, halogen-containing aryl glycols, oxyalkylene derivatives of the halogen-containing aryl glycols, halogen- or phosphorus-containing oxyalkyl derivatives, oxyalkylene derivatives of pyrophosphoric acid or of phosphoric acid, oxyalkylene derivatives of phosphoric acid, and oxyalkylene derivatives of aryl dicarboxylic acids.

4. Polyols-polyesters according to claim 1 or 2, wherein the amount of glycol having formula (I) is such as to provide a halogen- and/or phosphorus-content between 2 and 20% by weight, with respect to the polyol-polyester.

5. Polyols-polyesters according to claim 1 or 2, wherein the halogen is chlorine and/or bromine.

6. Polyols-polyesters according to claim 1 or 2, wherein the polyol is selected from the class consisting of aliphatic or cycloaliphatic glycols having from 2 to 12 carbon atoms, a polyoxyethylene glycol and a polyoxypropylene glycol having a molecular weight between 150 and 500.

7. A process for the production of polyol-polyester as in claim 1 or 2, characterized in reacting, at atmospheric or lower pressure and at a temperature between 100° and 250° C., DMT process residues with an excess of a polyol, at least 5% by weight thereof being constituted by one or more glycols having the above formula (I).

8. Flame-resistant polyurethane foams comprising the reaction product obtained by reacting an organic polyisocyanate with a halogen- and/or phosphorus-containing polyol-polyester obtained by esterification and tranesterification of DMT process residues with a polyol at least 5% weight of which is constituted by a glycol having the above formula (I).

9. A method of preparing fire-resistant polyurethane foams comprising reacting an organic polyisocyanate with a polyol-polyester as defined in claim 1 or 2, in the presence of a blowing agent

* * * * *